US010790769B2

(12) United States Patent
Wang et al.

(10) Patent No.: US 10,790,769 B2
(45) Date of Patent: Sep. 29, 2020

(54) CONTROL METHOD AND CONTROL SYSTEM FOR ENHANCING ENDURANCE TO ANOMALOUS VOLTAGE FOR DOUBLY-FED INDUCTION GENERATOR

(71) Applicants: WIND POWER TECHNOLOGY CENTER OF GANSU ELECTRIC POWER COMPANY, Qilihe District Lanzhou (CN); STATE GRID CORPORATION OF CHINA, Xicheng District (CN); GANSU ELECTRIC POWER COMPANY OF STATE GRID, Chengguan District Lanzhou (CN); SHANGHAI JIAO TONG UNIVERSITY, Minhang District (CN)

(72) Inventors: Ningbo Wang, Lanzhou (CN); Liang Lu, Lanzhou (CN); Kun Ding, Lanzhou (CN); Shiyuan Zhou, Lanzhou (CN); Chen Zhang, Minhang District (CN); Jin Li, Lanzhou (CN); Zheng Li, Minhang District (CN); Nianzong Bai, Lanzhou (CN); Jing Zhi, Lanzhou (CN); Xu Cai, Minhang District (CN); Youming Cai, Minhang District (CN)

(73) Assignees: Wind Power Technology Center of Gansu Electric Power Company, Oilihe District Lanzhou (CN); State Grid Corporation of China, Beijing (CN); Gansu Electric Power Company of State Grid, Chengguan District Lanzhou (CN); Shanghai Jiao Tong University, Shanghai (CN)

(*) Notice: Subject to any disclaimer, the term of this patent is extended or adjusted under 35 U.S.C. 154(b) by 0 days.

(21) Appl. No.: 16/081,890

(22) PCT Filed: Feb. 8, 2017

(86) PCT No.: PCT/CN2017/073115
§ 371 (c)(1),
(2) Date: Aug. 31, 2018

(87) PCT Pub. No.: WO2017/148252
PCT Pub. Date: Sep. 8, 2017

(65) Prior Publication Data
US 2019/0013753 A1    Jan. 10, 2019

(30) Foreign Application Priority Data

Mar. 1, 2016    (CN) .......................... 2016 1 0114252

(51) Int. Cl.
*H02P 9/00*    (2006.01)
*H02J 3/38*    (2006.01)
(Continued)

(52) U.S. Cl.
CPC ............ *H02P 9/006* (2013.01); *F03D 7/0284* (2013.01); *F03D 9/11* (2016.05); *F03D 9/255* (2017.02);
(Continued)

(58) Field of Classification Search
CPC ........ F05B 2220/30; F05B 2220/70646; F05B 2260/42; F05B 2260/80;
(Continued)

(56) References Cited

U.S. PATENT DOCUMENTS 7,884,492 B2 *    2/2011    Xiong ................... F03D 7/0272
                                                    290/55
8,860,236 B2 *    10/2014    Nasiri ................... F03D 7/0272
                                                    290/44
(Continued)

FOREIGN PATENT DOCUMENTS

CN    102231527 A    * 11/2011
CN    102780229 A    * 11/2012
(Continued)

OTHER PUBLICATIONS

English Abstract of CN 102780229 A reference. Author, Yang Cao, 2012.*
(Continued)

*Primary Examiner* — Julio C. Gonzalez
(74) *Attorney, Agent, or Firm* — Arent Fox LLP

(57) ABSTRACT

Provided are a control method and system for enhancing an endurance capability to an abnormal voltage of a wind turbine generator system. The control method, includes;
(Continued)

providing a doubly-fed wind turbine generator system connected to a power grid; detecting a voltage of the power grid, and determining whether the voltage of the power grid has a fault; when the voltage of the power grid has a fault, detecting a voltage of the DC buses, and determining whether the voltage of the DC buses exceeds a limit value; when the voltage of the DC buses exceeds the limit value, performing integrated system coordination control according to an abnormal operating condition mode; and when the voltage of the power grid returns to a normal range, performing integrated system coordination control according to a normal operating condition mode.

12 Claims, 6 Drawing Sheets

(51) Int. Cl.

| | | |
|---|---|---|
| *F03D 7/02* | (2006.01) | |
| *F03D 9/11* | (2016.01) | |
| *F03D 17/00* | (2016.01) | |
| *F03D 9/25* | (2016.01) | |
| *H02J 3/16* | (2006.01) | |
| *H02P 9/10* | (2006.01) | |
| *H02P 9/30* | (2006.01) | |
| *H02P 101/15* | (2016.01) | |
| *H02M 5/458* | (2006.01) | |

(52) U.S. Cl.
CPC ............... *F03D 17/00* (2016.05); *H02J 3/16* (2013.01); *H02J 3/38* (2013.01); *H02P 9/007* (2013.01); *H02P 9/102* (2013.01); *H02P 9/105* (2013.01); *H02P 9/305* (2013.01); *F05B 2220/30* (2013.01); *F05B 2220/70646* (2013.01); *F05B 2260/42* (2013.01); *F05B 2260/80* (2013.01); *F05B 2270/10711* (2013.01); *F05B 2270/337* (2013.01); *H02M 5/4585* (2013.01); *H02P 2101/15* (2015.01); *Y02A 30/62* (2018.01); *Y02E 10/763* (2013.01); *Y02E 40/34* (2013.01)

(58) Field of Classification Search
CPC ...... F05B 2270/10711; F05B 2270/337; F03D 17/00; F03D 7/0284; F03D 9/11; F03D 9/255; H02P 2101/15; H02P 9/006; H02P 9/007; H02P 9/102; H02P 9/105; H02P 9/305; H02J 3/16; H02J 3/38; H02M 5/4585; Y02A 30/62
USPC ..................................................... 290/44, 55
See application file for complete search history.

(56) References Cited

U.S. PATENT DOCUMENTS

| | | | |
|---|---|---|---|
| 10,084,403 B2 * | 9/2018 | Yuan | H02P 9/105 |
| 2019/0072070 A1 * | 3/2019 | Wang | H02J 3/24 |
| 2019/0123559 A1 * | 4/2019 | Dong | H02J 3/28 |

FOREIGN PATENT DOCUMENTS

| | | | |
|---|---|---|---|
| CN | 103078339 A | * | 5/2013 |
| CN | 103078349 A | | 5/2013 |
| CN | 103414205 A | | 11/2013 |
| CN | 105634013 A | | 6/2016 |

OTHER PUBLICATIONS

English Abstract of CN 102231527 A reference. Author Luowei Zhou, 2011.*
English Abstract of CN 103078339 A reference. Author Xu Liang, 2013.*
International Search Report; PCT Application No. PCT/CN2017/073115 dated Feb. 8, 2017.

* cited by examiner

CONTROL METHOD AND CONTROL SYSTEM FOR ENHANCING ENDURANCE TO ANOMALOUS VOLTAGE FOR DOUBLY-FED INDUCTION GENERATOR

CROSS-REFERENCES TO RELATED APPLICATIONS

This is a National Stage Application, filed under 35 U.S.C. 371, of International Patent Application No. PCT/CN2017/073115, filed on Feb. 8, 2017, which claims priority to Chinese patent application No, 2016101142516 filed on Mar. 1, 2016, contents of both of which are incorporated herein by reference in their entireties.

TECHNICAL FIELD

The present disclosure belongs to the field of the operation control of wind power generation, and, in particular, relates to a control method and system for enhancing an endurance capability to an abnormal voltage of a doubly-fed wind turbine generator system.

BACKGROUND

Since a stator of doubly-fed wind turbine generator system is directly connected to an electric power grid, the doubly-fed wind turbine generator system is susceptible to the disturbance of a voltage of the electric power grid. At present, a wind power grid-connected standard only focuses on a fault ride-through capability of the wind turbine generator system, and is insufficient in requirements for small voltage dip of the electric power grid and endurance to a low voltage and a high voltage. Facts prove that these aspects have a great impact on a continuous operation of the doubly-fed wind turbine generator system as well.

In terms of the endurance to the high voltage and the low voltage, there is a general requirement that the doubly-fed wind turbine generator system should operate normally between −10% and 10%, and no specific requirement for an operation capability at a lower voltage or a higher voltage. For the doubly-fed wind turbine generator system, it can be seen from simple analysis that an insufficient output voltage of a converter under the high voltage causes that the power is difficult to fed into the electric power grid; the converter easily generates an overcurrent under the low voltage. In addition, a capacity of a machine/network converter is not balanced, which may further cause an increasing in a voltage of buses, triggering a protection action. Active load shedding in a variable speed-pitching manner is one method to alleviate low voltage overloading. In a case of small voltage dip in the electric power grid, control strategies are often used to suppress the overcurrent of the rotor. Such a method is effective when the rotor converter provides a sufficient voltage, and a control model is accurate enough, which is very difficult to implement in practice.

In terms of the endurance to the high voltage and the low voltage, there is no comparatively perfect technology compromising the two. For a case of the low voltage, although the active load shedding by variable speed-pitching may theoretically prevent the converter from overloading, since a voltage fluctuation is a frequent event, such a pneumatic load shedding scheme undoubtedly increases a load of the doubly-fed wind turbine generator system and affects its service life.

An excitation system of the doubly-fed wind turbine generator system based on hybrid energy storage of a supercapacitor and a battery exists, the system controls the characteristic of the power outputted from a stator side of a doubly-fed generator by controlling the excitation of the rotor of the doubly-fed generator. The scheme has shortcomings that the excitation control algorithm is very complicated, and is difficult to implement and high in cost. Moreover, during a failure of a blower, a rotor-side converter may be disconnected from the electric power grid for a short-time, the doubly-fed wind turbine generator system cannot be effectively controlled.

In addition, there is further an apparatus for achieving a low voltage ride-through capability of the wind turbine generator system by employing the supercapacitor. In this scheme, the supercapacitor is mainly used for low voltage ride-through during a failure of a wind power plant, and cannot complete power adjustment in a normal operation according to a scheduling command. In addition, the scheme needs to especially set up a low voltage ride-through control system in the wind power plant, which has many problems such as more implementation investment and large space occupation, and corresponding operation control strategies are not provided.

SUMMARY

In view of this, it is necessary to provide a control method and system for enhancing an endurance capability to an abnormal voltage of a wind turbine generator system, to solve problems of transient instability of DC buses and intermittent operation of the wind turbine generator system.

A control method for enhancing an endurance capability to an abnormal voltage of a wind turbine generator system includes:

providing a doubly-fed wind turbine generator system connected to a power grid, where the doubly-fed wind turbine generator system includes a wind turbine, a gearbox, a generator, a converter and a supercapacitor energy storage apparatus, the supercapacitor energy storage apparatus includes a DC-DC converter and a supercapacitor, the converter includes a grid-side converter, a rotor-side converter and DC buses connected between the grid-side converter and the rotor-side converter, and the supercapacitor is electrically connected with the DC buses via the DC-DC converter;

detecting a voltage of the power grid, and determining whether the voltage of the power grid has a fault;

when determining that the voltage of the power grid has the fault, detecting a voltage of the DC buses, and determining whether the voltage of the DC bus exceeds a limit value;

when determining that the voltage of the DC bus exceeds the limit value, performing an integrated system coordination control on the supercapacitor energy storage apparatus and the converter according to an abnormal operating condition mode; and when determining that the voltage of the power grid returns to a normal range, performing the integrated system coordination control on the supercapacitor energy storage apparatus and the converter according to a normal operating condition mode.

A control system for enhancing an endurance capability to an abnormal voltage of a wind turbine generator system includes:

a doubly-fed wind turbine generator system connected with a power grid, which includes a wind turbine, a gearbox, a generator, a converter and a supercapacitor energy storage apparatus, where the supercapacitor energy storage apparatus includes a DC-DC converter and a supercapacitor, the converter comprises a grid-side converter, a rotor-side converter and DC buses connected between the grid-side converter and the rotor-side converter, and the supercapacitor is electrically connected with the DC buses via the DC-DC converter; and an integrated system coordination controller, which is configured to: when determining that a voltage of the DC buses exceeds a limit value, perform an integrated system coordination control on the supercapacitor energy storage apparatus and the converter according to an abnormal operating condition mode; and when that a voltage of the power grid returns to a normal range, perform the integrated system coordination control on the supercapacitor energy storage apparatus and the converter according to a normal operating condition mode.

The control method and system for the endurance capability to the abnormal voltage of the wind turbine generator system by employing a supercapacitor energy storage system, which are provided by the present disclosure, may be used for enhancing a fault handling capability of the doubly-fed wind turbine generator system, and enhancing the doubly-fed wind turbine generator system's endurance to small transient disturbance of the voltage of the power grid and continuous operation ability under the high/low voltage on the whole without changing an original control strategy of the wind turbine generator system. The control method and system is simple and reliable in control structure and algorithm as well as good in effect, and will not affect the operation and service life of other components of the wind turbine generator system.

DETAILED DESCRIPTION

In order to make objectives, technical solutions and advantages of the present disclosure be clear, the present disclosure will be further described in detail below with reference to accompanying drawings and embodiments. It is understood that the specific embodiments described herein are merely illustrative of the present disclosure and are not intended to limit the present disclosure.

Figure 1:
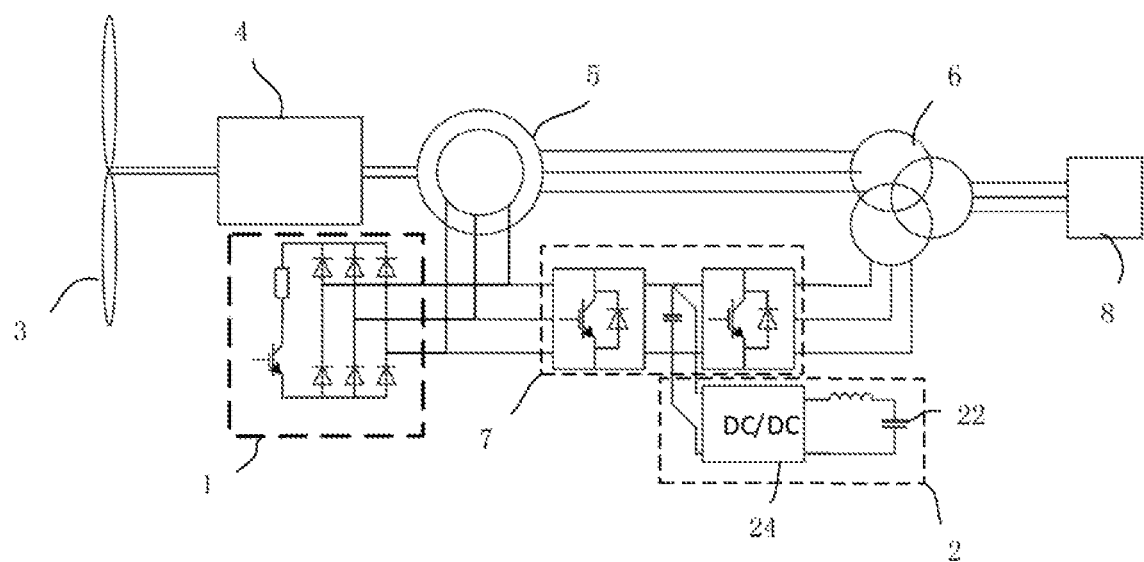
FIG. 1 is a schematic diagram showing a structure of a main circuit system of a doubly-fed wind turbine generator system according to an embodiment of the present disclosure.

An embodiment of the present disclosure provides a control method for enhancing an endurance capability to an abnormal voltage of a wind turbine generator system. The method is implemented by disposing a supercapacitor energy storage apparatus 2 in the doubly-fed wind turbine generator system. With reference to FIG. 1, the embodiment of the present disclosure further provides a doubly-fed wind turbine generator system with a supercapacitor energy storage system, which includes a generator 5, a converter 7 and a supercapacitor energy storage apparatus 2.

The doubly-fed wind turbine generator system may further include a wind turbine 3 and a gearbox 4. The wind turbine 3 drives the generator 5 to operate through the gearbox 4, so as to convert wind energy into electrical energy.

The doubly-fed wind turbine generator system may further include a transformer 6, and the doubly-fed wind turbine generator system is connected to a power grid 8 via the transformer 6.

The doubly-fed wind turbine generator system may further include a crowbar protection circuit 1, which is connected to a rotor. When a voltage of the converter 7 exceeds a set threshold, the crowbar protection circuit 1 is turned on to bypass a current on the rotor. The transformer 6 (e.g., a box-type transformer substation) may be a boosting transformer. In one embodiment, the transformer 6 is a 0.69/35 kV boosting transformer with a rated capacity of 3 MVA.

The generator 5 may be a doubly-fed induction generator, including a stator and a rotor, where the stator is connected to the power grid 8 via the transformer 6, and the rotor is connected to the power grid 8 via the converter 7.

Figure 2:
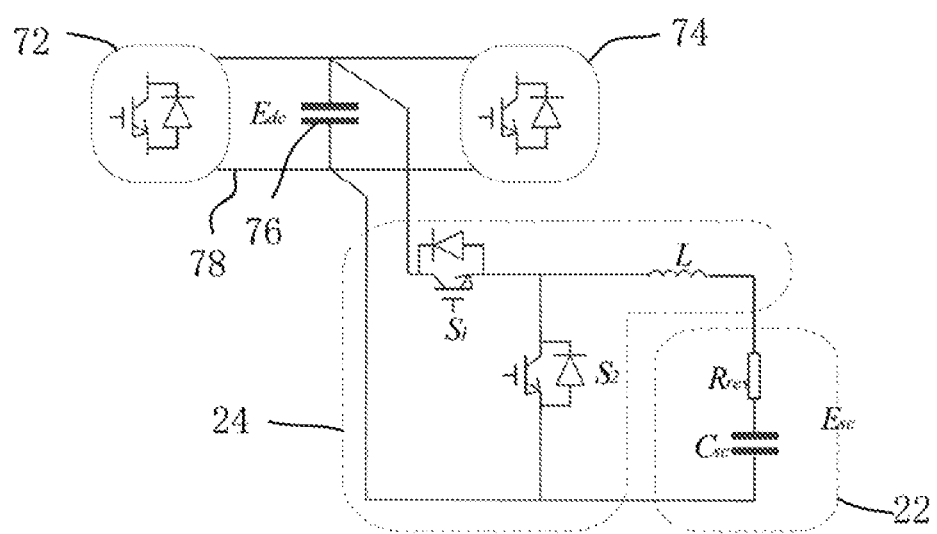
FIG. 2 is a schematic diagram showing a structure of a supercapacitor energy storage apparatus in FIG. 1.

With reference to FIG. 2 together, two ends of the supercapacitor energy storage apparatus 2 are electrically connected with two DC buses 78 of the converter 7, respectively. The converter 7 may further include a rotor-side converter 72 and a grid-side converter 74 electrically connected by the two DC buses 78, as well as a capacitor 76 two ends of which are electrically connected to the two DC buses 78 respectively. The supercapacitor energy storage apparatus 2 and the capacitor 76 are connected in parallel.

The supercapacitor energy storage apparatus 2 includes a DC-DC converter 24 and a supercapacitor 22. The supercapacitor 22 is mounted to the DC buses 78 of the converter 7 and electrically connected to the DC buses 78 of the converter 7 via the DC-DC converter 24, particularly, connected to two DC buses 78 of the converter 7 via the DC-DC converter 24. An equivalent circuit of the supercapacitor 22 in FIG. 2 includes an equivalent capacitor $C_{sc}$ and an equivalent resistor $R_{res}$ which are connected in series. A rated voltage of the supercapacitor 22 preferably ranges from 450 V to 960 V, and the power and the capacity of the supercapacitor 22 theoretically have no upper limits. In one embodiment, the supercapacitor has a voltage capacity $E_{sc}$ of 4 F, a power of 350 kW, and a rated voltage of 800 V.

The DC-DC converter 24 is preferably a buck-boost bidirectional converter including a first fully-controlled switch S1, a second fully-controlled switch S2 and a boosting inductor L. When electrical energy is transferred from the capacitor 76 of the DC buses 78 to the supercapacitor 22, the supercapacitor 22 is charged, and the DC-DC converter 24 operates in a buck mode. When the electrical energy is transferred from the supercapacitor 22 to the capacitor 76 of the DC buses 78, the supercapacitor 22 is discharged, and the DC-DC converter 24 operates in a boost mode. By adjusting a duty ratio of the switches in the DC-DC converter, specifically duty ratios of the fully-controlled switch S1 and/or the fully-controlled switch S2, the voltage the supercapacitor 22 may be adjusted, and the duty ratio may be varied between 0 and 1. A voltage of the DC-DC converter 24 is higher than a voltage of the supercapacitor 22. In one embodiment, in order to control the voltage of the DC buses 78, the DC-DC converter 24 is switched between the buck mode and the boost mode continuously.

In one embodiment, a first end of the boosting inductor L is connected in series with the first fully-controlled switch S1, and is connected to a first DC bus 78 of the converter 7 through the first fully-controlled switch S1, and a second end of the boosting inductor L is electrically connected to a first electrode of the supercapacitor 22. A second electrode of the supercapacitor 22 is electrically connected to a second DC bus 78 of the converter 7. The second fully-controlled switch S2 is connected between the first end of the boosting inductor L and the second electrode of the supercapacitor. The second fully-controlled switch S2 and the supercapacitor 22 are both connected in parallel with the capacitor 76 of the DC buses 78.

The first fully-controlled switch S1 includes a first transistor and a first diode connected in parallel. A drain of the first transistor is connected to an anode of the first diode and to the first end of the inductor L. A source of the first transistor is connected to a cathode of the first diode and connected to one DC bus 78 of the converter 7. The second fully-controlled switch S2 includes a second transistor and a second diode connected in parallel. A source of the second transistor is connected to a cathode of the second diode and to the first end of the inductor L. A drain of the second transistor is connected to an anode of the second diode and electrically connected to the second electrode of the supercapacitor 22.

The control method for enhancing the endurance capability to the abnormal voltage of the wind turbine generator system by employing the supercapacitor energy storage apparatus may ensure transient stability of the DC buses 78 and uninterrupted operation of the wind turbine generator system.

Figure 3:
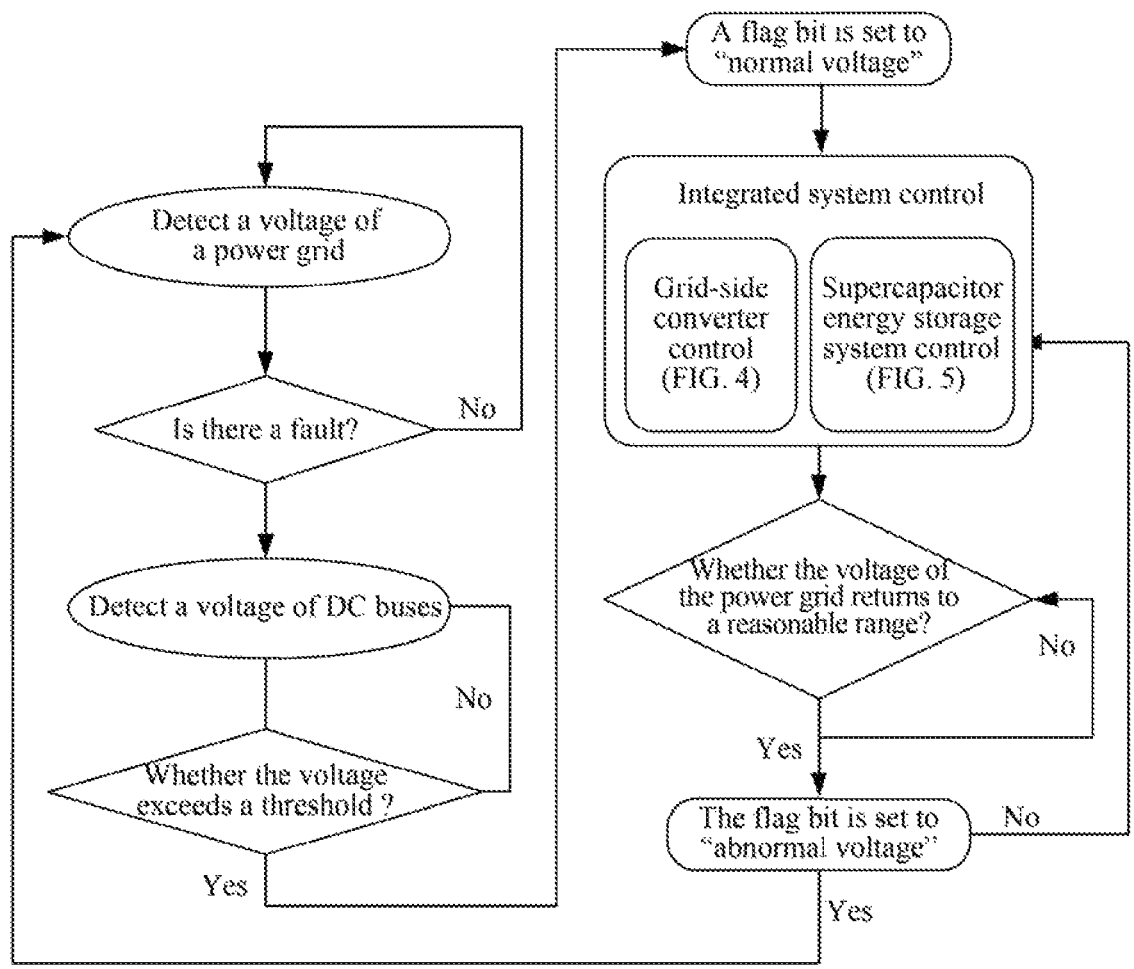
FIG. 3 is a flowchart of integrated system coordination control of a control method for enhancing an endurance capability to an abnormal voltage of a wind turbine generator system by employing a supercapacitor energy storage system according to an embodiment of the present disclosure.

With reference to FIG. 3, a control method for enhancing an endurance capability to an abnormal voltage of a wind turbine generator system, which is provided by the embodiment of the present disclosure, further includes: integrated system coordination control on the supercapacitor energy storage apparatus 2 and the converter 7, and a control process may include the following steps.

A voltage of the power grid is detected and it is determined whether the voltage of the power grid has a fault.

When it is determined that the voltage of the power grid has a fault, a voltage of DC buses 78 of the converter 7 is detected, and it is determined whether the voltage of the DC buses 78 exceeds a limit value or not.

When it is determined that the voltage of the DC buses 78 exceeds the limit value, a flag bit of the voltage of the power grid is set to "abnormal", and integrated system coordination control is performed on the supercapacitor energy storage apparatus 2 and the converter 7 according to an abnormal operating condition mode.

When it is determined that the voltage of the power grid returns to normal (that is, in a normal voltage range of the power grid), the flag bit of the voltage of the power grid is set to "normal", and integrated system coordination control is performed on the supercapacitor energy storage apparatus 2 and the converter 7 according to a normal operating condition mode.

The step of detecting the voltage of the power grid and determining whether the voltage of the power grid has a fault may continue throughout the control process. The fault of the voltage of the power grid may specifically be that the voltage of the power grid is higher or lower than the normal voltage range of the power grid, and the normal voltage range of the power grid may be set as required. The limit value of the voltage of the DC buses 78 may also be set as required, for example, the limit value is 1.05 p.u. (per unit), that is, exceeds a normal value by 5% of the normal value.

The integrated system coordination control may specifically include control of the grid-side converter and control of the supercapacitor energy storage system, which may be performed simultaneously.

The process of performing integrated system coordination control according to the abnormal operating condition mode includes: the grid-side converter is controlled according to the abnormal operating condition mode, and a boost control is performed on the supercapacitor energy storage apparatus 2. The process of performing integrated system coordination control according to the normal operating condition mode includes: the grid-side converter is controlled according to the normal operating condition mode, and a buck control is performed on the supercapacitor energy storage apparatus 2.

Figure 4:
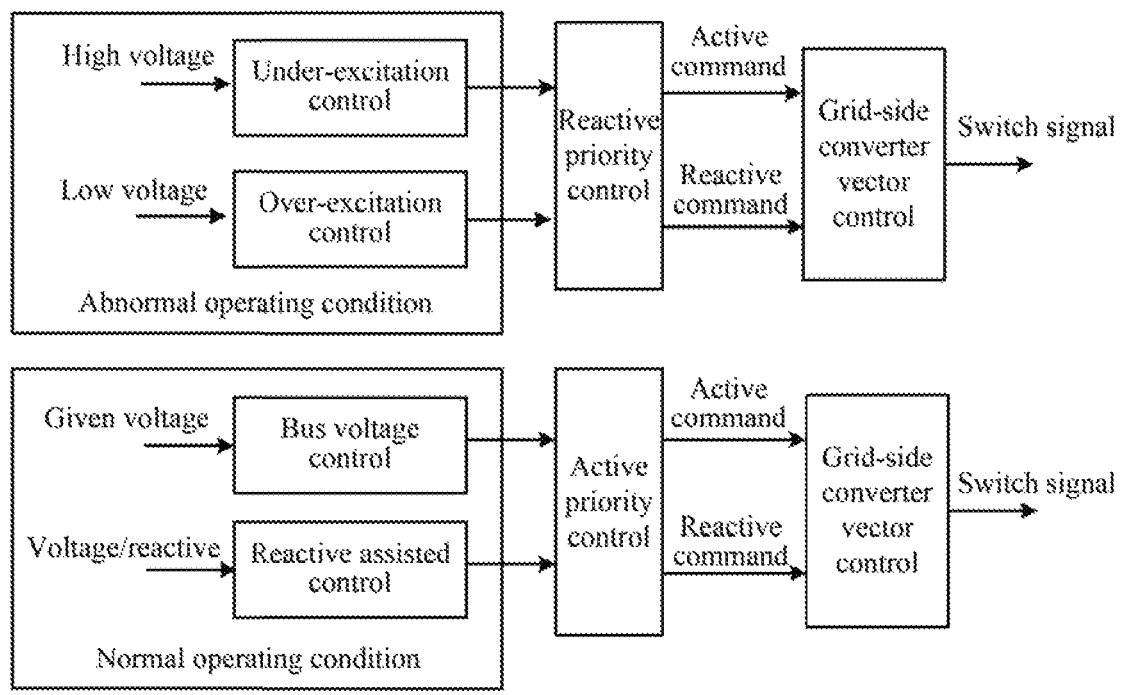
FIG. 4 is a schematic diagram of control processes of a grid-side converter in different control modes in FIG. 3.

With reference to FIG. 4, the grid-side converter has two control modes of a "normal operating condition" and an "abnormal operating condition" according to the flag bit of the voltage of the power grid. When the voltage of the power grid is normal (that, when the grid voltage is within the normal voltage range of the power grid), the grid-side converter is in the normal operating condition mode, and the grid-side converter controls the voltage of DC buses 78 to be constant. At this time, it is in an "active priority control" mode, and a certain reactive/voltage assisted control may be provided. When the voltage of the power grid is abnormal, the voltage of the power grid is higher than an upper limit of the normal voltage range of the power grid or lower than a lower limit of the normal voltage range of the power grid, the grid-side converter is in the abnormal operating condition mode, the grid-side converter performs strategy switching, the grid-side converter does not control the voltage of the buses any more, and at this time, it is in a "reactive priority control" mode.

In the "reactive priority control" mode, when the voltage of the power grid is lower than the lower limit of the normal voltage range of the power grid, the grid-side converter performs over-excitation control so as to support the voltage of the power grid, and injects a certain active power under a constraint of an apparent capacity. When the voltage of the power grid is higher than the upper limit of the normal voltage range of the power grid, the grid-side converter performs under-excitation control, and injects a certain active power under the constraint of the apparent capacity. The under-excitation control not only helps the recovery of the voltage of the power grid, but also may ensure that the grid-side converter is out of control due to over-modulation, that is, ensure that the grid-side converter is still controllable at an abnormal voltage.

Figure 5:
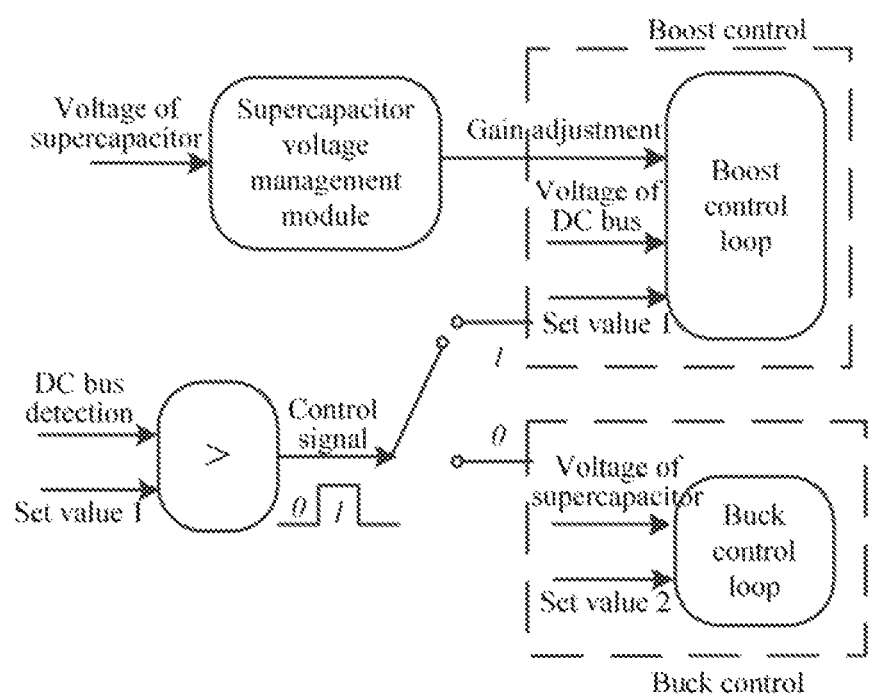
FIG. 5 is a schematic diagram of control processes of a supercapacitor energy storage system in different control modes in FIG. 3.

With reference to FIG. 5, a control strategy of a supercapacitor energy storage system includes boost control and buck control.

Since the grid-side converter does not control the voltage of the DC buses 78 in the "reactive priority control" mode any more, an active power input by the rotor-side converter will cause the voltage of the DC buses 78 to increase. The boost control is as follows. When the voltage of the DC buses 78 exceeds the limit value (that is, when a flag bit of the voltage of the power grid is set to "abnormal"), the supercapacitor 22 is used as an input terminal of the DC-DC converter 24, the capacitor 76 of the DC buses 78 is used as an output terminal of the DC-DC converter 24, and the voltage of the DC buses 78 is adjusted to be within a normal voltage range of the DC buses, that is, the voltage of the DC buses 78 is controlled.

The boost control includes: detecting the voltage of the DC buses 78 and controlling the voltage of the DC buses 78 to be within the normal voltage range of the DC buses 78 by controlling duty ratios of the first fully-controlled switch S1 and/or the second fully-controlled switch S2. The boost control may include: controlling the supercapacitor 22 to perform charge/discharge control on the capacitor 76 of the DC buses 78 by controlling the duty ratio of the second fully-controlled switch S2. When the voltage of the DC buses 78 is greater than the upper limit of the normal voltage range of the DC buses, the DC buses 78 may be caused to charge the supercapacitor 22 by controlling the duty ratio $d2$ of the second fully-controlled switch S2 (for example, making $d2>0.5$ and $d1=1-d2$), electrical energy is transferred from the capacitor 76 of the DC buses 78 to the supercapacitor 22, so that the voltage of the DC buses 78 is reduced. When the voltage of the DC buses 78 is lower than the lower limit of the normal voltage range of the DC buses, the DC buses 78 may be caused to discharge the supercapacitor 22 by controlling the duty ratio $d2$ of the second fully-controlled switch S2 (for example, making $d2<0.5$, and $d1=1-d2$), and the electrical energy is transferred from the supercapacitor 22 to the capacitor 76 of the DC buses, so that the voltage of the DC buses 78 is increased, and finally, the voltage of the DC buses 78 is controlled to be within the normal voltage range of the DC buses.

In order to realize control decoupling of the voltage of the DC buses 78 from the supercapacitor energy storage system and the DC unloading circuit (that is, the crowbar protection circuit 1), the limit value of the voltage of the DC buses 78 may be set to be slightly smaller than a triggering action value of the DC unloading circuit, so as to prevent the DC buses 78 and the DC unloading circuit from operating simultaneously, causing the voltage of the DC buses 78 to be instable. In addition to this, it is necessary to consider the operating voltage range of the supercapacitor 22 during the boost control, a gain factor is dynamically adjusted, so that an injection/absorption power of the supercapacitor 22 may be adjusted to prevent the voltage of the supercapacitor 22 from exceeding the operating range. For example, the gain factor is set to "0" or "1". When the voltage of the supercapacitor 22 exceeds the upper/lower limit, the gain factor is set energy storage system does not control the voltage of the DC buses 78 of the converter 7 any more, otherwise, the gain factor is set to "1", which indicates that the supercapacitor energy storage system controls the voltage of the DC buses 78.

The supercapacitor 22 has an allowable operating voltage range (for example, 450 V to 960 V). To prevent the supercapacitor 22 from overvoltage or undervoltage, control, that is, buck control, of the voltage of the supercapacitor 22 may be achieved by the DC-DC converter 24. Particularly, the voltage of the DC buses 78 is monitored while the boost control is performed. When the voltage of the DC buses 78 returns to the normal voltage range of the DC buses (that is, when the flag bit of the voltage of the power grid is set to "normal"), buck control is performed, the supercapacitor 22 serves as an output terminal of the DC-DC converter 24, the capacitor 76 of the DC buses serves as an input terminal of the DC-DC converter 24, and the voltage of the supercapacitor 22 is adjusted to be within the normal voltage range of the supercapacitor, that is, the voltage of the supercapacitor 22 is controlled.

The buck control includes: monitoring the voltage of the supercapacitor 22 and controlling the voltage of the supercapacitor 22 to be within the normal voltage range of the supercapacitor by controlling the duty ratios of the first fully-controlled switch S1 and/or the second fully-controlled switch S2. The buck control may include: causing the capacitor 79 of the DC buses to control the charge/discharge of the supercapacitor 22 by controlling the duty ratio of the first fully-controlled switch S1. When the voltage of the supercapacitor 22 is greater than an upper limit of the normal voltage range of the supercapacitor 22, the supercapacitor 22 may be discharged by controlling the duty ratio $d1$ of the first fully-controlled switch S1 (for example, making $d1>0.5$ and $d2=1-d1$), electrical energy is transferred from the supercapacitor 22 to the capacitor 76 of the DC buses 78, such that the voltage of the supercapacitor 22 is reduced. When the voltage of the supercapacitor 22 is lower than a lower limit of the normal voltage range of the supercapacitor, the supercapacitor 22 may be charged by controlling the duty ratio $d1$ of the first fully-controlled switch S1 (for example, making $d1<0.5$, and $d2=1-d1$), and the electrical energy is transferred from the capacitor 76 of the DC buses 78 to the supercapacitor 22, such that the voltage of the supercapacitor 22 is increased, and finally, the voltage of the supercapacitor 22 is adjusted.

Figure 6:
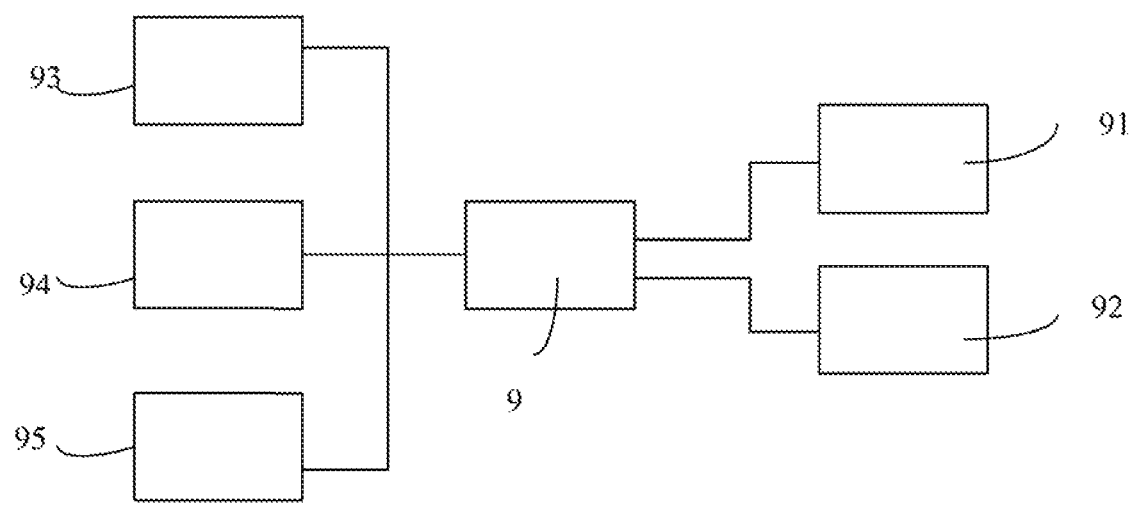
FIG. 6 is a schematic diagram of a connection relationship of an integrated system coordination controller according to an embodiment of the present disclosure.

With reference to FIG. 6, an embodiment of the present disclosure further provides a control system for enhancing an endurance capability to an abnormal voltage of a wind turbine generator system. The control system includes the doubly-fed wind turbine generator system and an integrated system coordination controller 9. The integrated system coordination controller 9 determines whether a voltage of a power grid has a fault. When it is determined that the voltage of the power grid has a fault, the integrated system coordination controller 9 determines whether a voltage of DC buses 78 exceeds a limit value or not. When the voltage of the DC buses 78 exceeds the limit value, the integrated system coordination controller 9 performs integrated system coordination control on a supercapacitor energy storage apparatus 2 and a converter 7 according to an abnormal operating condition mode. When the voltage of the power grid returns to normal, the integrated system coordination controller 9 performs integrated system coordination control on the supercapacitor energy storage apparatus 2 and the converter 7 according to a normal operating condition mode.

The integrated system coordination controller 9 includes a converter controller 91 and an energy storage apparatus controller 92. The energy storage apparatus controller 92 and the supercapacitor energy storage apparatus 2 together form a supercapacitor energy storage system. When the voltage of the DC buses 78 exceeds the limit value, the energy storage apparatus controller 92 controls the duty ratios of switches in the DC-DC converter 24 and performs the boost control. When it is determined that the voltage of the power grid returns to within the normal range, the energy storage apparatus controller 92 controls the duty ratios of the switches in the DC-DC converter 24 and performs the buck control.

The energy storage apparatus controller 92 performs the boost control, particularly, controls the voltage of the DC bus 78 to be within the normal voltage range of the DC bus.

In one embodiment, when the voltage of the DC buses 78 is greater than an upper limit of the normal voltage range of the DC buses, the energy storage apparatus controller 92 may control a duty ratio $d2$ of the second fully-controlled switch S2 (for example, make $d2>0.5$ and $d1=1-d2$) to enable the DC buses 78 to charge the supercapacitor 22, electrical energy is transferred from the capacitor 76 of the DC buses 78 to the supercapacitor 22, so that the voltage of the DC buses 78 is reduced. When the voltage of the DC buses 78 is lower than a lower limit of the normal voltage range of the DC buses, the energy storage apparatus controller 92 may control a duty ratio d2 of the second fully-controlled switch S2 (for example, make d2<0.5, and d1=1−d2) to enable the DC buses 78 to discharge the supercapacitor 22, and the electrical energy is transferred from the supercapacitor 22 to the capacitor 76 of the DC buses, so that the voltage of the DC buses 78 is increased.

The energy storage apparatus controller 92 performs the buck control, particularly, controls the voltage of the supercapacitor 22 to be within a normal operating voltage range of the supercapacitor.

In one embodiment, when the voltage of the supercapacitor 22 is greater than an upper limit of the normal voltage range of the supercapacitor, the energy storage apparatus controller 92 may control the duty ratio d1 of the first fully-controlled switch S1 (for example, make d1>0.5 and d2=1−d1) to discharge the supercapacitor 22, electrical energy is transferred from the supercapacitor 22 to the capacitor 76 of the DC buses 78, so that the voltage of the supercapacitor 22 is reduced. When the voltage of the supercapacitor 22 is lower than a lower limit of the normal voltage range of the supercapacitor, the energy storage apparatus controller 92 may control the duty ratio d1 of the first fully-controlled switch S1 (for example, make d1<0.5, and d2=1−d1) to charge the supercapacitor 22, and the electrical energy is transferred from the capacitor 76 of the DC buses to the supercapacitor 22, so that the voltage of the supercapacitor 22 is increased, and finally, the voltage of the supercapacitor 22 is adjusted.

In addition, the control system for enhancing the endurance capability to the abnormal voltage of the wind turbine generator system may further include a DC bus voltage detection module 93 and a power grid voltage detection module 94. In one embodiment, the control system may further include a supercapacitor voltage detection module 95. The DC bus voltage detection module 93, the power grid voltage detection module 94, and the supercapacitor voltage detection module 95 detect the voltage of the DC buses, the voltage of the power grid, and the voltage of the supercapacitor 22, respectively, and transmit detection results to the integrated system coordination controller 9.

By means of the above control method for enhancing the endurance capability to the abnormal voltage of the wind turbine generator system, the supercapacitor energy storage system may realize the following controls.

Its operating voltage is maintained when the voltage of the power grid is normal.

When the voltage of the power grid is abnormal, since the grid-side converter is switched to the "reactive priority control" mode, in order to balance a generator/network power, the supercapacitor controls the voltage of the DC buses to ensure continuous operation of the wind turbine generator system. Moreover, the supercapacitor may also suppress a transient process of the voltage of the DC buses due to voltage dip of the power grid.

The present disclosure provides a control method for the endurance capability to the abnormal voltage of the wind turbine generator system by employing a supercapacitor energy storage system, which may be used for enhancing a fault handling capability of the doubly-fed wind turbine generator system. The control method solves continuous operation problems of the doubly-fed wind turbine generator system in the cases of small temporary disturbance of the grid voltage, and under a high/low voltage without drastically changing the original control strategy and control structure of the wind turbine generator system. The algorithm of the control method is simple and reliable as well as good in effect, and the operation and service life of other components of the wind turbine generator system are not affected.

The above embodiments are only used to illustrate the technical solutions of the present disclosure and are not intended to limit them. Although, the present disclosure has been described in detail with reference to the above embodiments, those skilled in the art may still make modifications or equivalent substitutions on the specific embodiments of the present disclosure, and any modifications or equivalent substitutions made without departing from the spirit and scope of the disclosure may be within a protective scope of claims to be approved by the present disclosure.

What is claimed is:

1. A control method for enhancing an endurance capability to an abnormal voltage of a wind turbine generator system, comprising:

providing a doubly-fed wind turbine generator system connected to a power grid, wherein the doubly-fed wind turbine generator system comprises a wind turbine, a gearbox, a generator, a grid-side converter, a rotor-side converter, DC buses connected between the grid-side converter and the rotor-side converter, and a supercapacitor energy storage apparatus, the supercapacitor energy storage apparatus comprises a DC-DC converter and a supercapacitor, and the supercapacitor is electrically connected with the DC buses via the DC-DC converter;

detecting a voltage of the power grid, and determining whether the voltage of the power grid is in a first predetermined voltage range;

in response to determining that the voltage of the power grid is not in the first predetermined voltage range, detecting a voltage of the DC buses, and determining whether the voltage of the DC bus exceeds a limit value;

in response to determining that the voltage of the DC bus exceeds the limit value, performing an integrated system coordination control on the supercapacitor energy storage apparatus and the grid-side converter according to a first operating condition mode; and in response to determining that the voltage of the power grid returns to the first predetermined voltage range, performing the integrated system coordination control on the supercapacitor energy storage apparatus and the grid-side converter according to second operating condition mode, wherein the integrated system coordination control on the supercapacitor energy storage apparatus and the grid-side converter according to the first operating condition mode comprises:

causing the grid-side converter not to control the voltage of the DC buses;

performing a boost control on the supercapacitor energy storage apparatus;

when the voltage of the power grid is lower than a lower limit of the first predetermined voltage range, causing the grid-side converter to perform an over-excitation control, and when the voltage of the power grid is higher than an upper limit of the first predetermined voltage range, causing the grid-side converter to perform an under-excitation control, wherein the integrated system coordination control on the supercapacitor energy storage apparatus and the grid-side converter according to the second operating condition mode comprises:
    causing the grid-side converter to make the voltage of the DC buses constant, and
    performing a buck control on the supercapacitor energy storage apparatus.

2. The control method for enhancing an endurance capability to an abnormal voltage of a wind turbine generator system according to claim 1, wherein the boost control on the supercapacitor energy storage apparatus comprises: controlling the voltage of the DC buses in a second predetermined voltage range.

3. The control method for enhancing an endurance capability to an abnormal voltage of a wind turbine generator system according to claim 1, wherein the boost control on the supercapacitor energy storage apparatus comprises:
    in response to determining that the voltage of the DC buses is greater than an upper limit of a second predetermined voltage range, transferring electrical energy from a capacitor of the DC buses to the supercapacitor, such that the voltage of the DC buses is reduced; and
    in response to determining that the voltage of the DC buses is less than a lower limit of the the second predetermined voltage range, transferring electrical energy from the supercapacitor to the capacitor of the DC buses, so that the voltage of the DC buses is increased.

4. The control method for enhancing an endurance capability to an abnormal voltage of a wind turbine generator system according to claim 1, wherein the buck control on the supercapacitor energy storage apparatus comprises: controlling a voltage of the supercapacitor in a third predetermined voltage range.

5. The control method for enhancing an endurance capability to an abnormal voltage of a wind turbine generator system according to claim 1, wherein the buck control on the supercapacitor energy storage apparatus comprises:
    in response to determining that a voltage of the supercapacitor is greater than an upper limit of a third predetermined voltage range, transferring electrical energy from the supercapacitor to a capacitor of the DC buses, so that the voltage of the supercapacitor is reduced; and
    in response to determining that the voltage of the supercapacitor is less than a lower limit of the third predetermined voltage range, transferring electrical energy from the capacitor of the DC buses to the supercapacitor, so that the voltage of the supercapacitor is increased.

6. A control system for enhancing an endurance capability to an abnormal voltage of a wind turbine generator system, comprising:
    a doubly-fed wind turbine generator system connected with a power grid, wherein the doubly-fed wind turbine generator system comprises a wind turbine, a gearbox, a generator, a grid-side converter, a rotor-side converter, DC buses connected between the grid-side converter and the rotor-side converter, and a supercapacitor energy storage apparatus, the supercapacitor energy storage apparatus comprises a DC-DC converter and a supercapacitor, and the supercapacitor is electrically connected with the DC buses via the DC-DC converter; and
    an integrated system coordination controller, which is configured to:
        detect a voltage of the power grid, and determine whether the voltage of the power grid is in a first predetermined voltage range;
        in response to determining that the voltage of the power grid is not in the first predetermined voltage range, detect a voltage of the DC buses, and determine whether the voltage of the DC bus exceeds a limit value;
        in response to determining that the voltage of the DC bus exceeds the limit value, perform an integrated system coordination control on the supercapacitor energy storage apparatus and the grid-side converter according to a first operating condition mode; and
        in response to determining that the voltage of the power grid returns to the first predetermined voltage range, perform the integrated system coordination control on the supercapacitor energy storage apparatus and the grid-side converter according to a second operating condition mode,
    wherein the integrated system coordination control on the supercapacitor energy storage apparatus and the grid-side converter according to the first operating condition mode comprises:
        causing the grid-side converter not to control the voltage of the DC buses;
        performing a boost control on the supercapacitor energy storage apparatus;
        when the voltage of the power grid is lower than a lower limit of the first predetermined voltage range, causing the grid-side converter to perform an over-excitation control, and
        when the voltage of the power grid is higher than an upper limit of the first predetermined voltage range, causing the grid-side converter to perform an under-excitation control,
    wherein the integrated system coordination control on the supercapacitor energy storage apparatus and the grid-side converter according to the second operating condition mode comprises:
        causing the grid-side converter to make the voltage of the DC buses constant, and
        performing a buck control on the supercapacitor energy storage apparatus.

7. The control system for enhancing an endurance capability to an abnormal voltage of a wind turbine generator system according to claim 6, wherein the DC buses comprise a first DC bus and a second DC bus, and the DC-DC converter comprises an inductor, a first fully-controlled switch and a second fully-controlled switch, wherein a first end of the inductor and the first fully-controlled switch are connected in series, the first end of the inductor is connected to the first DC bus through the first fully-controlled switch, a second end of the inductor is electrically connected to a first electrode of the supercapacitor, a second electrode of the supercapacitor is electrically connected with the second DC bus, the second fully-controlled switch is connected between the first end of the inductor and the second electrode of the supercapacitor.

8. The control system for enhancing an endurance capability to an abnormal voltage of a wind turbine generator system according to claim 7, wherein the first fully-controlled switch comprises a first transistor and a first diode connected in parallel, a drain of the first transistor is connected to an anode of the first diode and to the first end of the inductor, a source of the first transistor is connected to a cathode of the first diode and to the first DC bus; the second fully-controlled switch comprises a second transistor and a second diode connected in parallel, a source of the second transistor is connected to a cathode of the second diode and to the first end of the inductor, and a drain of the second transistor is connected to an anode of the second diode and is electrically connected to the second electrode of the supercapacitor.

9. The control system for enhancing an endurance capability to an abnormal voltage of a wind turbine generator system according to claim 6, wherein the integrated system coordination controller comprises a converter controller and an energy storage apparatus controller.

10. The control system for enhancing an endurance capability to an abnormal voltage of a wind turbine generator system according to claim 9, wherein the energy storage apparatus controller is configured to perform a boost control to control the voltage of the DC buses when the voltage of the DC buses exceeds the limit value.

11. The control system for enhancing an endurance capability to an abnormal voltage of a wind turbine generator system according to claim 10, wherein the energy storage apparatus controller is configured to: when the voltage of the DC buses is greater than an upper limit of a second predetermined voltage range, transfer electrical energy from a capacitor of the DC buses to the supercapacitor, so that the voltage of the DC buses is reduced, and wherein the energy storage apparatus controller is configured to: when the voltage of the DC buses is less than a lower limit of the second predetermined voltage range, transfer electrical energy from the supercapacitor to the capacitor of the DC buses, so that the voltage of the DC buses is increased.

12. The control system for enhancing an endurance capability to an abnormal voltage of a wind turbine generator system according to claim 9, wherein the energy storage apparatus controller is configured to: when a voltage of the supercapacitor is greater than an upper limit of a third predetermined voltage range, transfer electrical energy from the supercapacitor to a capacitor of the DC buses, so that the voltage of the supercapacitor is reduced; and wherein the energy storage apparatus controller is configured to: when the voltage of the supercapacitor is less than a lower limit of the third predetermined voltage range, transfer electrical energy from the capacitor of the DC buses to the supercapacitor, so that the voltage of the supercapacitor is increased.

* * * * *

UNITED STATES PATENT AND TRADEMARK OFFICE
CERTIFICATE OF CORRECTION

PATENT NO. : 10,790,769 B2
APPLICATION NO. : 16/081890
DATED : September 29, 2020
INVENTOR(S) : Ningbo Wang et al.

It is certified that error appears in the above-identified patent and that said Letters Patent is hereby corrected as shown below:

On the Title Page

Item (73) Assignees, the address of Wind Power Technology Center of Gansu Electric Power Company, which reads:
Oilihe District Lanzhou (CN)
Should read:
Qilihe District Lanzhou (CN)

Signed and Sealed this
Twenty-fourth Day of November, 2020

Andrei Iancu
*Director of the United States Patent and Trademark Office*